United States Patent [19]

Van Hook et al.

[11] 4,276,276

[45] Jun. 30, 1981

[54] PROCESS FOR NITRITE PRODUCTION

[75] Inventors: James P. Van Hook, Basking Ridge; Clair E. Hildebrand, Whippany; Chong H. Chan, Princeton Junction, all of N.J.

[73] Assignee: Allied Chemical Corporation, Morris Township, Morris County, N.J.

[21] Appl. No.: 135,025

[22] Filed: Mar. 28, 1980

Related U.S. Application Data

[63] Continuation-in-part of Ser. No. 50,725, Jun. 21, 1979, abandoned.

[51] Int. Cl.³ .............................................. C01B 21/20
[52] U.S. Cl. ..................................... 423/385; 423/235
[58] Field of Search ........................ 423/235, 385, 400

[56] References Cited

U.S. PATENT DOCUMENTS

| | | | |
|---|---|---|---|
| 1,061,630 | 5/1913 | Pauling | 423/400 |
| 1,070,070 | 8/1913 | Rothe | 423/385 |
| 3,453,071 | 7/1969 | Schmitt | 423/235 |
| 4,045,540 | 8/1977 | Hertzog | 423/385 |

FOREIGN PATENT DOCUMENTS 669791  2/1929  France ..................................... 423/400

Primary Examiner—G. O. Peters
Attorney, Agent, or Firm—James Riesenfeld; Gerhard H. Fuchs

[57] ABSTRACT

An improved process for nitrite production is based on controlled oxidation of nitric oxide in a mixture of nitrogen oxides and oxygen. Oxidized gas is absorbed into an aqueous solution containing a basically reacting ammonium or alkali metal compound to produce nitrite and unabsorbed exit gas. The mole ratio of nitric oxide (NO) to nitrogen dioxide ($NO_2$) in the unabsorbed exit gas is maintained within a range between 0.8 and 1.2 by either recycling a selected fraction of oxidized gas through the oxidizer or by selectively splitting the inlet stream to the oxidizer. Increased product yield as well as reduced $NO_x$ emissions are achieved as a result.

6 Claims, 2 Drawing Figures

PROCESS FOR NITRITE PRODUCTION

DESCRIPTION

CROSS-REFERENCE TO PRIOR APPLICATION

This application is a continuation-in-part of application Ser. No. 050,725, filed June 21, 1979 now abandoned.

BACKGROUND OF THE INVENTION

1. Field of the Invention

This invention relates to a process which by controlling the oxidation of nitric oxide permits reduced emission of nitrogen oxides and increased yield in the production of ammonium nitrite and alkali metal nitrites.

2. Description of the Prior Art

The absorption of nitrous gases into an absorption medium is an important step in a variety of chemical processes. Among these are processes for the production of nitrites, nitrates and nitric acid. Furthermore, nitrogen oxides ($NO_x$) constitute undesirable by-products of many industrial processes. If emitted to the atmosphere, $NO_x$ is an environmental pollutant. In particular, $NO_x$ initiates a complex series of reactions which results in photochemical smog. Consequently, a great deal of research has been directed toward controlling $NO_x$ absorption into various absorption media.

U.S. Pat. No. 1,070,070, issued Aug. 12, 1913, to Rothe discloses a process for producing nitrite from nitrous gases containing air or oxygen by absorption in an alkaline medium. The patent discloses a method of increasing the quantitative yield of nitrites, which consists in subdividing the current of gases to be absorbed into separate gas currents on the way from the place of production to the absorbing medium, and so regulating the conditions of time and temperature in the respective subdivided gas currents that the nitrous constituents in one portion are delivered into contact with the absorbing medium substantially as $NO_2$ and nitrous contituents in the other portion are delivered into the absorbing medium substantially as NO, the gas currents being again commingled in such manner that at the moment of absorption a sufficient quantity of NO is present to satisfy the molecular ratio of $NO+NO_2=N_2O_3$.

U.S. Pat. No. 1,061,630, issued May 13, 1913, to Pauling and U.S. Pat. No. 3,453,071, issued July 1, 1969, to Schmitt, et al., disclose processes for producing substantially equimolecular mixtures of NO and $NO_2$ for absorption by means of suitable absorbing agents.

None of these patents teaches a process that overcomes the serious problem of environmental pollution by $No_x$ emission. Thus there is a need for a process that provides controlled oxidation of nitric oxide to yield maximum gas absorption in a basic solution and minimum $NO_x$ effluent.

An important commercial process that yields $NO_x$ as a byproduct is ammonium nitrite production. Large tonnages of ammonium nitrite are produced for use in the production of hydroxylamine compounds, which in turn are used in the manufacture of caprolactam via an intermediate, cyclohexanone oxime, and in the manufacture of specialty oximes. Ammonium nitrite is produced by contacting in an absorption tower an aqueous system containing a basically reacting ammonium compound with a gaseous stream containing NO, $NO_2$, oxygen and inert gas.

U.S. Pat. No. 4,045,540, issued Aug. 30, 1977, to R. R. Hertzog, discloses a process for reducing $NO_x$ emission in ammonium nitrite production by adding $NO_2$ to the gas being absorbed in the absorption tower to reduce the mole ratio of $NO:NO_2$ from at least 2.0 (in the entering gas) to between 0.8 and 1.0 (in the exiting gas). The $NO_2$ is generated by oxidation of part of the NO present in the entering gas. If too much oxidation takes place, production of ammonium nitrate reduces the yield of ammonium nitrite.

Although Hertzog's process permits substantial reduction in $NO_x$ emission, it does not provide adjustments in oxidation to compensate for changes in operating conditions, such as throughput and composition of the feed gas and temperature and pressure in the absorption tower. Specifically, changes in interfacial gas-liquid contact area and/or gas residence time and partial pressures considerably affect the value of the ratio and make it virtually impossible to insure absorption of the nitrogen-oxygen compounds to below 1000 ppm $NO_x$ in the effluent vent gas. Changes affecting the production capacity of the unit result in changes in oxygen consumption which relate directly to the oxidation state of the fixed nitrogen in the aqueous product and exit gas streams.

SUMMARY OF THE INVENTION

The present invention provides an improved process for producing ammonium nitrite and alkali metal nitrites. In a process characterized by passing a feed gas comprising nitric oxide, nitrogen dioxide, and oxygen through an oxidizer in which aqueous nitric acid is recirculated to produce an oxidized gas and passing the oxidized gas into an aqueous absorption solution containing a basically reacting compound of the formula MX, wherein M is selected from the group consisting of ammonium and the alkali metals and X is selected from the group consisting of carbonate, bicarbonate, hydroxide and mixtures thereof to produce a nitrite and unabsorbed exit gas; the improvement comprises monitoring the mole ratio of nitric oxide to nitrogen dioxide in the unabsorbed exit gas and maintaining the nitric oxide: nitrogen dioxide mole ratio at about 0.8 to 1.2 in the unabsorbed exit gas by increasing nitric oxide oxidation when the ratio approaches 1.2 and decreasing nitric oxide oxidation when the ratio approaches 0.8. The invention provides very low levels of both $NO_x$ emission and undesirable nitrate production. The preferred $NO:NO_2$ mole ratio is in the range of about 0.9 to 1.1. The preferred embodiment of this invention is a process for producing ammonium nitrite.

Adjustment of the degree of NO oxidation is accomplished by one of two alternative methods. The first is to recycle a selected proportion of gas from the oxidizer outlet back to the inlet. The second is to split the feed gas introduced into the oxidizer into at least two streams, which enter the oxidizer at different heights, and to adjust the proportion of the gas entering in each stream. Alternatively, the two methods may be used in combination.

DESCRIPTION OF THE PREFERRED EMBODIMENTS

Figure 1:
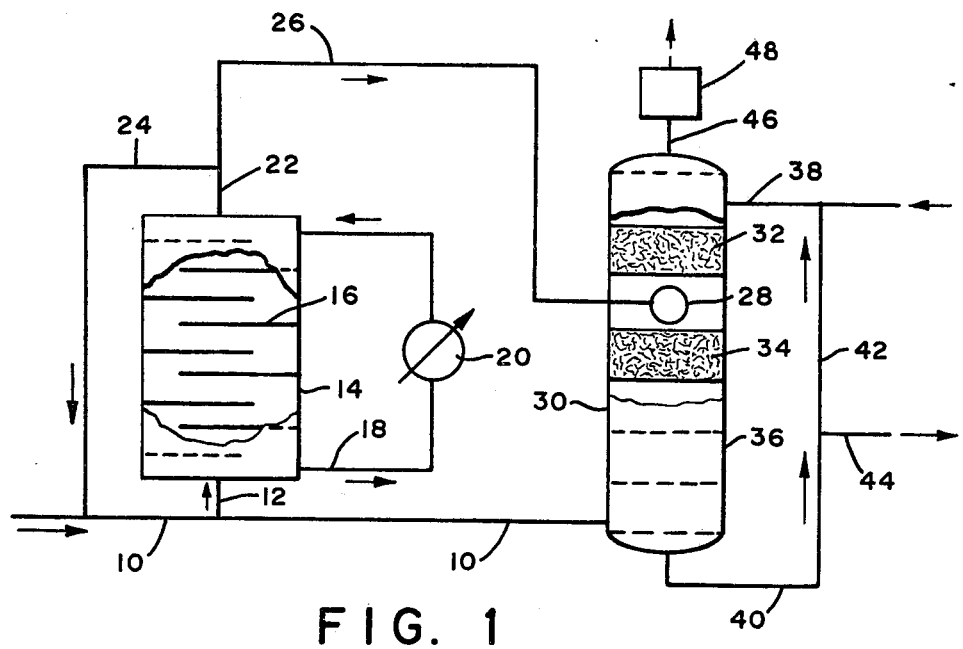
FIG. 1 is a diagrammatic flow sheet illustrating an embodiment of the present invention that uses oxidized gas recycle.

The preferred embodiment of this invention involves scrubbing an NO-rich $NO_x$-containing gas with an aqueous nitric acid solution in an oxidizer and recycling a selected proportion of the $NO_2$-rich product gas to the feed gas stream containing predominantly NO, so as to control, by means of gas recycle fraction and aqueous nitric acid temperature, the composition of the exit gas to any desired $NO:NO_2$ mole ratio in the range from about 0.8 to 1.2. To the extent that other oxides of nitrogen are present (e.g. $N_2O_4$, $N_2O_3$, etc), they are considered to be combinations of molecules of NO and $NO_2$ and need not be considered independently. Routine testing reveals the mole ratio that provides minimum $NO_x$ effluent and/or maximum product yield. Maintenance of that ratio provides optimum control of the process under various conditions of feed gas production rates, partial pressures and compositions. Although the gas recycle fraction that minimizes $NO_x$ effluent generally provides high yield of product (e.g. $NH_4NO_2$), the $NO:NO_2$ mole ratio may be maintained so as to maximize yield rather than to minimize $NO_x$ emission. For example, a practical alternative control method is to monitor $NO_x$ in the effluent and increase oxidation only when $NO_x$ approaches the maximum permitted (or desired).

An alternative to recycling product gas is splitting the feed gas stream and introducing the feed gas at two or more different heights in the oxidizer. Preferably, if two inlets admit feed gas to the oxidizer, the second inlet admits the feed gas when the oxidation of NO is about 50 to 95 percent complete based on the NO in the feed gas. If three inlets admit feed gas, the second and third admit the feed gas when the oxidation of NO is about 50 to 60 and 85 to 95 percent complete, respectively. The "recycling" and "split feed" alternatives may also be used in combination.

Since the rate of molecular oxygen consumption in the oxidizer is thermolecular in nature, product gas recycling to attain dilution is an extremely effective way of controlling the reactions, so that the required vapor product stream can be obtained under wide variations in throughput and feed gas stream composition. By monitoring the exit gas composition, and consequently knowing the molecular oxygen consumption, the proportion of oxidized gas recycled may be adjusted to maintain the exit gas $NO:NO_2$ mole ratio within the desired range. The relationship between this ratio and the oxidized gas recycle, throughput rate and other operating conditions is extremely complex. However, the relationship is unimodal, so that a conventional feedback control loop with empirical adjustment of controller settings (proportional, reset and derivative modes) may be used. Recycle (or split feed) is adjusted by means of a control valve, blower or other means known in the art. The time lag between the change in recycle and change in exit gas mole ratio depends on system parameters but is typically about 60 to 90 seconds and may be determined more precisely by routine testing.

A side-effect of changing the proportion of gas recycled may be the production or consumption of $HNO_3$ in the oxidizer. If it is desired to counteract this effect, the $HNO_3$ chiller temperature may be adjusted so that there is no net production or consumption of $HNO_3$ or water in the aqueous phase. For example, if the recycle portion is reduced to lower the $NO:NO_2$ mole ratio, it may be necessary to raise the chiller temperature to prevent $HNO_3$ production.

Adjustment of the proportion of gas recycled and of the $HNO_3$ chiller temperature are sufficient controls to obtain the desired gas composition under steady state operation. In order to minimize changes in temperature due to the exothermic nature of the reaction and to minimize changes in aqueous nitric acid strength within the oxidizer system, the rate of circulating aqueous nitric acid should be greater than the equivalent of 20 moles of $HNO_3$ per mole of NO fed. For 100% stoichiometric oxygen consumption (based on $NO + \frac{1}{2}O_2 \rightarrow NO_2$), this condition would lead to approximately an 8° C. temperature rise in the aqueous nitric acid and a maximum internal acid strength change of 3 basis points (e.g. 60% acid to 57% acid).

Since the oxidation of NO by molecular oxygen has only a small (negative) temperature effect, the oxygen consumption is essentially controlled by the oxidizer size, fresh feed gas throughput (contact time), and partial pressure of NO. Theoretically, oxygen partial pressure is also a control on the rate and consumption of oxygen, but in practical application of the use of ammonia burner gas, the oxygen fed is far in excess of stoichiometric requirements and consequently has only a minor effect on the oxygen consumption reaction. Thus, at a reduced or increased feed gas loading to a given sized oxidizer, there is a substantial change in the exit gas composition as dictated by oxygen consumption and a close approach to reaction and absorption equilibria. In addition, there is a particular combination of acid recirculation strength and temperature at which no net nitric acid or water is consumed or produced in the recirculating nitric acid liquid phase. Operation is preferably at that combination; however, the utility of the process is not limited to those conditions.

By using the proposed procedure of adjusting gas recycle proportion and, if necessary, aqueous nitric acid temperature, a product gas stream can be prepared which, when mixed with an NO-rich atmosphere polluting gas stream, will produce a gas mixture of $NO_x$ composition which will absorb rapidly and effectively into alkaline media (e.g. $(NH_4)_2CO_3$, NaOH, and $Na_2CO_3$ aqueous solutions).

If a higher ratio of nitrite to nitrate is desired in the liquid product of the $NO_x$ alkaline absorber, (i.e. higher $NO:NO_2$ mole ratio desired), the gas recycle proportion is increased and, if necessary, the nitric acid chiller temperature adjusted to achieve the desired (lower) $O_2$ consumption. The appropriate adjustments in gas recycle proportion and chiller temperature are made on the basis of $NO:NO_2$ ratio of the exit gas and the desired nitrite/nitrate content of the liquid product. Conversely if more $NO_2$ is desirable, recycle proportion is decreased to yield higher oxygen consumption with appropriate adjustment in chiller temperature if necessary.

To accomplish the above results and expand the region of control to wider variations in fresh feed throughput, partial pressure, and gas composition, inert gas (e.g. $CO_2$ or $N_2$) may be added to the fresh gas feed or recycled gas lines.

Referring to the drawings in more detail, FIG. 1 illustrates a preferred embodiment of the present invention for ammonium nitrite production. A similar apparatus and process is used to produce alkali nitrites. A feed gas is produced, for example, by ammonia oxidation and includes a mixture of $NO_x$ and air. The feed gas enters the system via line 10 and part of the gas—typically about 5-15%—is passed via line 12 to oxidizer 14, wherein a substantial portion of the NO is oxidized to $NO_2$ by countercurrent contact with an aqueous nitric acid solution. The remainder of the feed gas passes directly to absorption tower 30.

Oxidizer 14 preferably contains gas-liquid contact trays 16 to prevent end to end mixing of the gas in the oxidizer. Suitable trays include shower deck trays, bubble cap trays, and sieve trays. The nitric acid is recirculated into oxidizer 14 via line 18 through chiller 20, where the temperature of the nitric acid is preferably maintained so that no net acid or water is consumed or produced. Oxidized gas leaves oxidizer 14 through line 22 and a controlled part of it is recycled to line 12 via line 24. The remainder passes via line 26 to mixer 28, which is preferably located inside absorption tower 30, although it could be outside the tower. The following reaction takes place in the gaseous phase in mixer 28:

$$NO + NO_2 \rightarrow N_2O_3$$

Absorption tower 30 has three packed sections, 32, 34, and 36. The gaseous streams entering the tower via lines 10 and 26 rise through it in countercurrent contact with an alkaline absorbing solution, such as ammonium carbonate, ammonium bicarbonate, ammonium hydroxide and mixtures thereof. The absorbing solution enters the tower via line 38, and the stream enriched in ammonium nitrite passes out of tower 30 and into line 40. A portion of the stream is recycled via lines 42 and 38, while the remainder is withdrawn from the process via line 44. Unabsorbed exit gas from tower 30 is discharged via line 46, and the $NO:NO_2$ ratio in the exit gas is monitored using an analyzer 48. Analyzer 48 may be any suitable instrument known in the art for measuring NO and $NO_2$ concentrations in a gas. Typical of such instruments are those based on chemiluminescense that measure NO and total $NO_x$ concentrations ($NO_2$ is obtained by difference).

The $NO:NO_2$ mole ratio is maintained within the range of about 0.8 to 1.2, and preferably about 0.9 to 1.1, by adjusting the proportion of oxidized gas recycled through line 24. This adjustment can be either manual or, preferably, automatic. Adjustment of chiller 20 to achieve the desired aqueous nitric acid temperature may also be necessary.

Figure 2:
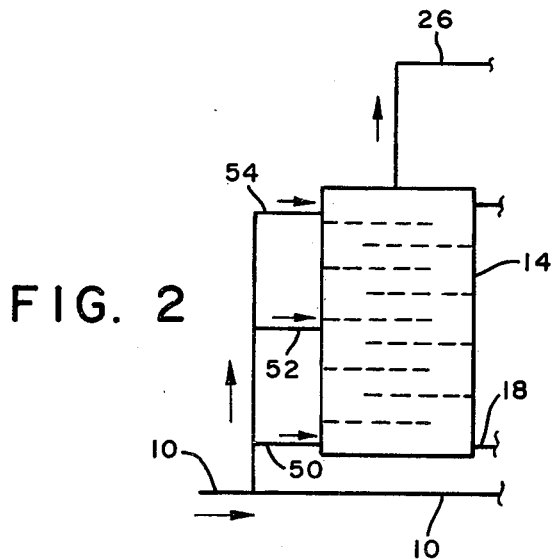
FIG. 2 is a diagrammatic flow sheet illustrating an alternative embodiment of the present invention that uses a split feed to the oxidizer.

FIG. 2 depicts an alternative method for regulating the $NO:NO_2$ mole ratio in the exit gas. Feed gas from line 10 enters oxidizer 14 through lines 50, 52, and 54 at different heights in the oxidizer. The proportion of feed gas passing through each line is adjusted to maintain the desired $NO:NO_2$ mole ratio. The methods shown in FIGS. 1 and 2 may be used in combination. To accomplish this, recycle line 24 of FIG. 1 may be incorporated into the apparatus of FIG. 2, so that oxidized gas is recycled to line 10 and split to enter oxidizer 14 through lines 50, 52 and 54.

The following examples illustrate the principles and practice of the present invention. The specific techniques, conditions, material and reported data are exemplary and should not be construed as limiting the scope of the invention.

EXAMPLE 1

A conventional absorption tower having 3 sections packed with 1 and 2 inch porcelain saddle is connected to an auxiliary NO oxidizer system as shown in FIG. 1. The oxidizer is sized to have a free volume approximately 1/5 that of tower 30 and is fitted with 5 shower deck trays. A $3.33 \times 10^{-4}$ m$^3$/s stream of the nitric acid produced in situ is recycled and simultaneously cooled to 60° C. The acid concentration equilibrates at approximately 58%. The gaseous recycle loop 24 is equipped with a variable speed blower to provide a continuously variable recycle flow controllable from 0 to 3 times the fresh feed volume of stream 12. The recycle blower speed is continuously adjusted by a coventional 3-mode controller empirically tuned to vary recycle flow according to the inverse of the $NO:NO_2$ ratio in the exit gas from tower 30. In this example, a set point of 1.0 (corresponding to a $NO_x$ concentration of 250 ppm) is selected and the controller tuning is adjusted to change the recycle flow ratio within the range from 0 to 3.0 whenever a 10% deviation in $NO:NO_2$ ratio persists for more than 120 seconds.

A stream consisting of 69.81% $N_2$, 7.29% $O_2$, 7.09% NO, 0.87% $NO_2$, and 14.94% $H_2O$ (volume %) is fed at a rate of 0.057 m$^3$/s to the combined oxidizer/absorption tower system. Of this quanity approximately 12%, or $6.67 \times 10^{-3}$ m$^3$/s, is diverted to the oxidizer (through line 12) with the remaining 88 percent going directly to the tower. An aqueous solution containing 5.5 wt % ammonium bicarbonate and 16.4 wt % ammonium carbonate is fed to the tower at a rate sufficient to maintain a 14 wt % ammonium nitrite concentration in the product line 44. Under these conditions, normal variation in the multiplicity of tower operating parameters cause the concentration of $NO_x$ flowing from bed 34 to vary from 5,000 to 10,000 ppm. Table I, which lists these variations in absolute units, clearly shows that by adjusting the recycle flow through line 24 from 0 to 2.4 it is possible to provide an exit gas stream which has the optimal $NO:NO_2$ ratio of 1.0 even under widely varying operating conditions. Within these limits it is possible to maintain the optimum nitrite production and emissions control by taking advantage of the direct unimodal relationship between $NO:NO_2$ ratio and oxidizer recycle ratio.

TABLE I

| CONTROL BY RECYCLE | | | | |
|---|---|---|---|---|
| | Gas in Absorption Tower (Moles) | | | Recycle Ratio |
| | from Section 34 | from Line 26 | at Mixer 28 | $NO/NO_2$ | (Recycle/Fresh) |
| Max. NO, $NO_x$ | | | | | |
| NO | 81.2 | 3.8 | 85.0 | 1 | 0 |
| $NO_2$ | 3.8 | 81.2 | 85.0 | | |
| Reduced NO, $NO_x$ | | | | | |
| NO | 35.2 | 26.8 | 62.0 | 1 | 2.4 |
| $NO_2$ | 3.9 | 58.1 | 62.0 | | |

Using these concepts it is possible to adjust the controller to maintain the predetermined emission control level of between 225 and 275 ppm $NO_x$ without any detectable decrease in ammonium nitrite production. Since it is well established that any $NO_2$ in excess of the optimal ratio would be absorbed as nitrate and excess NO is very slowly absorbed at these dilute concentrations, it will be apparent to those skilled in the art that the following results are obtained if the control system of this invention is not used. Specifically, referring to Table I:

(1) A fixed flow oxidation system set to provide optimal $NO:NO_2$ ratios at the maximum permissible NO emission would meet the 250 ppm average $NO_x$ control limit under the reduced NO, $NO_x$ flow, but approximately 46 moles (~50%) of the oxidizer flow would be converted to the undesirable nitrate.

(2) An oxidizer system set to maximize nitrite production at the lower NO limit would result in the loss of approximately 38–40 moles of NO feed as the NO from section 34 increases from 5,000 to 10,000 ppm. This would increase $NO_x$ emissions to more than 3,000 ppm.

EXAMPLE 2

The absorption system of Example 1 is operated in an identical manner except that the degree of oxidation is controlled by passing a fraction of the feed through line 54 (FIG. 2), which is fitted with a control valve. Line 54 admits feed gas to the oxidizer at a point where oxidation of NO is about 95% complete. Line 52 is not used in this example. Table II illustrates the split feed control required to achieve the same end conditions listed in Table I, Example 1.

TABLE II
CONTROL BY SPLIT FEED

| | Fraction of Feed Gas to Oxidizer | Ratio of Split Flow to Direct Flow (Line 54/Line 50) |
|---|---|---|
| Max. NO,$NO_x$ | 0.12 | 0 |
| Reduced NO,$NO_x$ | 0.12 | 0.4 |

We claim:

1. In a process for producing nitrite of the type characterized by passing a feed gas comprising nitric oxide, nitrogen dioxide, and oxygen through an oxidizer in which aqueous nitric acid is recirculated to produce an oxidized gas and passing said oxidized gas into an aqueous absorbtion solution containing a basically reacting compound of the formula MX, wherein M is selected from the group consisting of ammonium and the alkali metals and X is selected from the group consisting of carbonate, bicarbonate, hydroxide and mixtures thereof to produce a nitrite and unabsorbed exit gas; the improvement which comprises monitoring the mole ratio of nitric oxide to nitrogen dioxide in the unabsorbed exit gas and maintaining the nitric oxide:nitrogen dioxide mole ratio at about 0.8 to 1.2 in the unabsorbed exit gas by increasing nitric oxide oxidation when the ratio approaches 1.2 and decreasing nitric oxide oxidation when the ratio approaches 0.8.

2. The process of claim 1 wherein the degree of nitric oxide oxidation is adjusted by recycling a selected proportion of gas from the oxidizer outlet back to the inlet.

3. The process of claim 2 wherein the proportion of gas recycled is selected to yield a nitric oxide: nitrogen dioxide mole ratio of about 0.9 to 1.1 in the unabsorbed exit gas.

4. The process of claim 1 wherein the degree of nitric oxide oxidation is adjusted by splitting the feed gas introduced into the oxidizer into at least two streams, which enter the oxidizer at different heights, and adjusting the proportion of the gas entering in each stream.

5. The process of claim 4 wherein the proportion of the gas entering in each stream is adjusted to yield a nitric oxide: nitrogen dioxide mole ratio of about 0.9 to 1.1 in the unabsorbed exit gas.

6. The process of claim 1 wherein M is ammonium.

* * * * *